United States Patent [19]

Townsley

[11] 3,883,397

[45] May 13, 1975

[54] MATERIAL FOR BIOLOGICAL DEGRADATION OF PETROLEUM

[75] Inventor: Philip McNair Townsley, Vancouver, British Columbia, Canada

[73] Assignee: John Dunn Agencies Ltd., Vancouver, British Columbia, Canada

[22] Filed: July 12, 1973

[21] Appl. No.: 378,647

[52] U.S. Cl. ............... 195/100; 195/101; 195/102; 195/103; 210/DIG. 21
[51] Int. Cl. ............................................. C12k 1/10
[58] Field of Search .......... 195/100, 101, 102, 103; 426/96, 97, 99; 210/DIG. 21; 252/316

[56] References Cited
UNITED STATES PATENTS 2,372,402  3/1945  Stokes et al. ................... 426/99 X
3,634,227  1/1972  Patterson ..................... 210/DIG. 21

*Primary Examiner*—A. Louis Monacell
*Assistant Examiner*—Robert J. Warden
*Attorney, Agent, or Firm*—Carver and Company

[57] ABSTRACT

Material for promoting growth of petroleum-degrading bacteria to aid in eradication of oil slicks of water which consists of a mixture of bacterial available nutrients, in particulate form, each nutrient particle having a coating of a salt of a fatty acid which is lipophilic, partially hydrophobic, and biodegradable, for retarding entry of the nutrient into the water at the oil water interface.

6 Claims, No Drawings

MATERIAL FOR BIOLOGICAL DEGRADATION OF PETROLEUM

BACKGROUND OF THE INVENTION

1. Field of the Invention

This invention relates to method and means for treatment of ocean oil spills and in particular to treatment which results in degradation of the oil.

2. Prior Art

Ocean oil spills which are increasing in frequency due to ever increasing ocean transportation of petroleum and petroleum products has, and will continue to result in, extensive ecological damage as evidenced by the effect of the oil spillage from the Torrey Canyon in the English Channel and various spills and seepage along the coast of California. Mechanical means have been devised to recover oil however present oil recovery methods and apparatus have not been entirely successful particularly near shorelines and where the oceans are turbulent.

Other means of oil treatment include methods for fostering microbial degradation of oil. Degrading of petroleum by bacteria and fungi depends to a large degree on the presence of several factors; firstly, the microorganisms capable of degrading the particular petroleum must be present. Secondly oxygen and water must be present. Thirdly a medium capable of supplying the essential nutrients required for metabolism and life of the organism must be present.

It has been estimated that approximately one-fourth of the micro-organisms found in nature will degrade oil. In soils and water rich in organic matter many thousands of organisms may be present in one gram of sample. Environmental factors such as would occur in oceans of the Arctic or the Tropics or on various terrestrial areas of the earth select and promote the development of micro-organisms suitable to the particular and specific growth conditions. On land limiting amounts of nutrients are usually found in the soil so that degradation of petroleum will proceed albeit usually slowly. However under natural conditions without added nutrient to meet specific nutritional demands, the oceans do not contain the nutrients in sufficient quantities to aid in rapid microbial degradation of oil.

Maximum microbial activity occurs mainly at the interface of oil and water and rather than fostering such activity oil slicks remaining after mechanical pickup have heretofore been abandoned. Nutrients together with bacteria have been used on oil slicks, however the nutrients are usually compounds of nitrogen and phosphorous which are hydrophilic and highly soluble in water. Thus most of the hydrophilic nutrient is quickly dissipated and lost to the vast amount of water of the ocean and consequently microbial activity sufficient to achieve biodegradation of vast quantities of oil cannot be maintained, for a length of time to achieve microbial build up and rapid degradation.

SUMMARY OF THE INVENTION

The present invention contemplates the use of microbial nutrients for fostering microbial activity, the nutrients being in dry particulate form. The particles of nutrient are coated with a lipophilic, partially hydrophobic, and biodegradable coating a particle size is such that particles will remain at the interface of the oil and water or be suspended in the oil so nutrient is released slowing and thus to sustain microbial activity over an extended period. The description following merely describes the preferred embodiments of the invention, which is, capable of expression in structure other than that particularly described

DETAILED DESCRIPTION

Composition of petroleum bacteria on a percentage dry basis is substantially as follows:

carbon 48 percent
nitrogen 12.5 percent
phosphorous 1 – 2.5 percent
sulpher and magnesium 0.3 – 1.0 percent
potassium, calcium 0.2 – 0.5 percent
sodium, iron 0.01 – 0.1 percent
zinc, copper, manganese 0.001 – 0.01 percent.

The requirements of such bacteria for nourishment are substantially in the ratio of their average composition.

Approximately 1 gram of bacterial cells is produced from 1 gram of alkane petroleum. The petroleum supplies the required carbon content however other nutrients for example nitrogen for protein and other cell nitrogen needs must be provided, in general by the surrounding environment.

One gram of bacterial cells requires 125 milligrams of nitrogen. Therefore the average weight of nitrogen to alkane in the nutrient particles should be no less than 0.15 – 1.0, respectively, if the alkane of the particle is to be consumed and sufficient nitrogen is to be available to utilize petroleum. The other microbial nutrients are added with the nitrogen compound in a fixed ratio depending on the specific requirements of the conditions of microbial nutrition.

An example of nutrient formulation for ocean petroleums can have the following proportions.

125 mg. of nitrogen in the form of an ammonium compound eg. $(NH_4)_2SO_4$,
25 mg. phosphorous in the form of microbial available phosphate compound eg. $NaH_2PO_4H_2O$ or $(NH_4)_2H_6PO_4$,
2.5 mg. iron in the form of microbial available iron compound eg. $FeSO_4.7H_2O$.

The nutrient particles which are in a dry pulverulant state are coated, in the conventional manner, with a suitable salt of a fatty acid which is lipophilic, partially hydrophobic and biodegradable. Several fatty acids or mixtures of fatty acids such as Lauric (C 12), Myristic (C 14), Palmitic (C 16), Stearic (C 18), and Arachidic (C 20) which form insoluble salts with certain ions such as magnesium, aluminum, calcium are suitable.

One of the most effective coatings is magnesium stearate. In preparing the coated particle, the microbial nutrient is reduced to a powder and is coated by mixing it into melted magnesium stearate and the mixture agitated and cooled to solidify the magnesium salt. The magnesium form of the fatty acid not only serves as a nutrient but also retards the solution of the coating in the petroleum. The coated particles, in order to be most effective in usage, should be less than one millimeter in diameter.

In trials using magnesium stearate coated nutrient, 250 milligrams of coated particles were added to 5 milliliters of crude oil in a vessel containing one gallon of ocean seawater. A control sample having 5 milliliters of crude oil floating on one gallon of seawater was maintained at the same temperature and conditions.

Within 60 hours no visible traces of petroleum were evident on the treated sample, whereas, no apparent change was observed in the untreated control sample. During the test it was noted that the coated nutrient particles were reasonably stable within the petroleum layer, remaining within the petroleum as suspended particles located throughout the petroleum and at the petroleum side of the oil water interface. The tests indicated that the bacterial nourishment within the coated nutrient is available to bacteria by way of slow nutrient diffusion and by bacterial solubilization and by fracture of the biodegradable coating.

In practical use the coated nutrient particles are seeded by aerodusting or such other suitable means over an oil spill. Due to the size of the particles and due to the hydrophobic coating the particles will disperse throughout the oil mass particularly at the oil water interface. The hydrophobic quality of the coating insures that the nutrients are made available to the microbial organisms slowly so that microbial activity is sustained over a period necessary to achieve substantial total oil degradation whether the petroleum is at sea or is washed up on shore.

We claim:

1. A particulate material for promoting growth of petroleum degrading bacteria in oil slicks floating on water, each particle having:
   a. a core of solid water soluable microbial available nutrient selected from the group consisting of nitrogen in the form of an ammonium compound, phosphorous in the form of a microbial available phosphate compound, and iron in a form of microbial available iron compound,
   b. a coating encapsulating the core composed of a metalic salt of a fatty acid which is lipophylic, patially hydrophobic and biodegradable, the metal in the salt being selected from the group consisting of magnesium, aluminum and calcium.

2. A material as claimed in claim 1 in which each coated particle in the material is less than 1 millimeter in diameter.

3. A material as claimed in claim 1 in which the coating is magnesium stearate.

4. A method for treatment of oil slicks floating on water for promoting growth of petroleum degrading bacteria comprising seeding the oil slick with a particulate material, each particle having:
   a. a core of solid water-soluble microbial available nutrient,
   b. a coating encapsulating the core composed of a metalic salt of a fatty acid which is lipophylic, partially hydrophobic and biodegradable, the metal in the salt being selected from the group consisting of magnesium, aluminum and calcium.

5. A method as claimed in claim 4 in which the fatty acid is selected from the group consisting of Lauric acid, Myristic acid, Palmitic acid, Stearic acid and Arachidic acid.

6. A method as claimed in claim 5 in which each coated particle in the material is less than 1 millimeter in diameter.

* * * * *